United States Patent
Cho et al.

(10) Patent No.: US 12,067,420 B2
(45) Date of Patent: Aug. 20, 2024

(54) DEEP LEARNING AUTOTUNING TASK OPTIMIZATION

(71) Applicant: HEWLETT PACKARD ENTERPRISE DEVELOPMENT LP, Houston, TX (US)

(72) Inventors: Junguk Cho, Milpitas, CA (US); Puneet Sharma, Milpitas, CA (US); Dominik Stiller, Boeblingen (DE)

(73) Assignee: Hewlett Packard Enterprise Development LP, Spring, TX (US)

( * ) Notice: Subject to any disclaimer, the term of this patent is extended or adjusted under 35 U.S.C. 154(b) by 791 days.

(21) Appl. No.: 17/077,962

(22) Filed: Oct. 22, 2020

(65) Prior Publication Data

US 2022/0129315 A1    Apr. 28, 2022

(51) Int. Cl.
| | |
|---|---|
| *G06F 9/50* | (2006.01) |
| *B60W 50/00* | (2006.01) |
| *G05D 1/00* | (2006.01) |
| *G06N 20/00* | (2019.01) |
| *G08G 1/00* | (2006.01) |

(52) U.S. Cl.
CPC ........... *G06F 9/5011* (2013.01); *B60W 50/00* (2013.01); *G05D 1/0212* (2013.01); *G06N 20/00* (2019.01); *G08G 1/20* (2013.01); *G08G 1/202* (2013.01)

(58) Field of Classification Search
CPC ............... G06F 9/5011; G06F 11/3024; G06F 11/3409; G06F 11/3466; G06F 9/4881; G06F 9/5077; G06N 20/00; G06N 3/045; G06N 3/063

See application file for complete search history.

(56) References Cited

U.S. PATENT DOCUMENTS

| | | | |
|---|---|---|---|
| 10,228,922 B2 | 3/2019 | Boehm et al. | |
| 2010/0095299 A1* | 4/2010 | Gupta | G06F 16/2471 718/103 |
| 2011/0228922 A1 | 9/2011 | Dhara et al. | |
| 2016/0078361 A1* | 3/2016 | Brueckner | H04L 67/10 706/12 |
| 2018/0322462 A1* | 11/2018 | Jayaraman | G06Q 10/103 |

(Continued)

FOREIGN PATENT DOCUMENTS

CN    110046046    7/2019

OTHER PUBLICATIONS

Ahn et al., "Chameleon: Adaptive Code Optimization for Expedited Deep Neural Network Compilation," ICLR 2020, Jan. 23, 2020, pp. 1-17.

(Continued)

*Primary Examiner* — Kenneth Tang
(74) *Attorney, Agent, or Firm* — Sheppard Mullin Richter & Hampton LLP

(57) ABSTRACT

Systems and methods are provided for improving autotuning procedures. For example, the system can implement a task launcher, a scheduler, and an agent to launch, schedule, and execute decomposed autotuning stages, respectively. The scheduling policy implemented by the scheduler may perform operations beyond a simple scheduling policy (e.g., a FIFO-based scheduling policy), which produces a high queuing delay. By leveraging autotuning specific domain knowledge, this may help reduce queuing delay and improve resource utilization that is otherwise found in traditional systems.

20 Claims, 9 Drawing Sheets

(56) References Cited

U.S. PATENT DOCUMENTS

| | | | |
|---|---|---|---|
| 2019/0050756 A1* | 2/2019 | Dirac | G06N 20/00 |
| 2019/0205746 A1* | 7/2019 | Nurvitadhi | G06N 20/00 |
| 2020/0097847 A1* | 3/2020 | Convertino | G06F 11/3447 |
| 2020/0364088 A1* | 11/2020 | Ashwathnarayan | G06F 9/5016 |
| 2020/0364508 A1* | 11/2020 | Gurel | G06V 20/41 |
| 2021/0144517 A1* | 5/2021 | Guim Bernat | H04L 67/10 |
| 2022/0101437 A1* | 3/2022 | Gao | G06F 16/26 |
| 2022/0188700 A1* | 6/2022 | Khavronin | G06Q 30/0201 |
| 2023/0134690 A1* | 5/2023 | Chen | G06N 3/045 345/419 |
| 2023/0236947 A1* | 7/2023 | Frohwitter | G06F 8/445 702/182 |

OTHER PUBLICATIONS

Ahn et al., "Reinforcement Learning and Adaptive Sampling for Optimized DNN Compilation," Computer Science, May 30, 2019, 11 pages.

Akiba t al., "Extremely Large Minibatch SGD: Training ResNet-50 on ImageNet in 15 Minutes," Nov. 12, 2017, pp. 1-4.

Apache TVM, "Scale up measurement by using multiple devices," available online at <https://web.archive.org/web/20200919111851/https://tvm.apache.org/docs/tutorials/autotvm/tune_relay_cuda.html#/scale-up-measurement-by-using-multiple-devices>, Sep. 19, 2020, 9 pages.

Awatramani et al., "Increasing gpu throughput using kernel interleaved thread block scheduling," In 2013 IEEE 31st International Conference on Computer Design (ICCD), Oct. 6-9, 2013, pp. 503-506.

AWS, "Amazon EC2 P2 Instances: Powerful, Scalable GPU instances for high-performance computing," available online at <https://web.archive.org/web/20201021031252/https://aws.amazon.com/ec2/instance-types/p2/>, Oct. 21, 2020, 4 pages.

AWS, "Amazon EC2 P3 Instances: Accelerate machine learning and high performance computing applications with powerful GPUs," available online at <https://web.archive.org/web/20201017163938/https://aws.amazon.com/ec2/instance-types/p3/>, Oct. 17, 2020, 20 pages.

AWS, "Amazon SageMaker Neo," available online at <https://web.archive.org/web/20201018133845/https://aws.amazon.com/sagemaker/neo/>, Oct. 18, 2020, 6 pages.

Chen et al., "Learning to Optimize Tensor Programs," Computer Science, Jan. 8, 2019, pp. 1-16.

Chen et al., "TVM: An Automated End-to-End Optimizing Compiler for Deep Learning," Proceedings of the 13th USENIX Symposium on Operating Systems Design and Implementation (OSDI '18), Oct. 8-10, 2018, 17 pages.

Codreanu et al., "Achieving deep learning Training in less than 40 minutes on ImageNet-1K & best accuracy and training time on ImageNet-22K & Places365 with scale-out Intel® Xeon® /Xeon Phi™ architectures," Surf Communities, Sep. 4, 2017, 14 pages.

Goyal et al., "Accurate, Large Minibatch SGD: Training ImageNet in 1 Hour," Computer Vision and Pattern Recognition, Apr. 30, 2018, pp. 1-12.

Hazelwood, "Applied machine learning at facebook: A datacenter infrastructure perspective," In 2018 IEEE International Symposium on High Performance Computer Architecture (HPCA), Feb. 24-28, 2018, pp. 620-629.

He et al., "Deep residual learning for image recognition," 2016 IEEE Conference on Computer Vision and Pattern Recognition (CVPR), Dec. 10, 2015, pp. 1-12.

Intel®, "Intel® Math Kernel Library," available online at <https://software.intel.com/content/www/us/en/develop/tools/math-kernel-library.html>, 2019, 7 pages.

Jain et al., "Dynamic Space-Time Scheduling for GPU Inference," 32nd Conference on Neural Information Processing Systems (NeurIPS 2018), Dec. 1, 2018, pp. 1-8.

Jeon et al., "Analysis of Large-Scale Multi-Tenant GPU Clusters for DNN Training Workloads," Proceedings of the 2019 USENIX Annual Technical Conference, Jul. 10-12, 2019, 15 pages.

Jeremy Howard, "Training Imagenet in 3 hours for 25; and CIFAR10 for 0.26," Fast.ai, May 2, 2018, 8 pages.

Kirkpatrick et al., "Optimization by Simulated Annealing," Science, vol. 220, No. 4598, May 13, 1983, pp. 671-680.

Liu et al., "Optimizing CNN Model Inference on CPUs," Usenix ATC'19, Jul. 10-12, 2019, pp. 1025-1039.

Ma et al., "Hierarchical task scheduler for interleaving subtasks on heterogeneous multiprocessor platforms," In Proceedings of the 2005 Asia and South Pacific Design Automation Conference, Feb. 2005, pp. 952-955.

NVIDIA Developer, "NVIDIA cuDNN," available online at <https://web.archive.org/web/20201016224154/https://developer.nvidia.com/cudnn>, Oct. 16, 2020, 5 pages.

NVIDIA, "Multi-Process Service," version—vR450, Jun. 2020, 28 pages.

Ragan-Kelley et al., "Halide: A Language and Compiler for Optimizing Parallelism, Locality, and Recomputation in Image Processing Pipelines," PLDI '13, Jun. 16-21, 2013, 12 pages.

Rotem et al., "Glow: Graph lowering compiler techniques for neural networks," May 4, 2018, pp. 1-10.

Seagate Technology, "Smart manufacturing moves from autonomous to intelligent: Inside Project Athena: Seagate's internal AI edge platform," 2019, 4 pages.

Tomczak et al., "Simulating Execution Time of Tensor Programs using Graph Neural Networks," Machine Learning, ICLR 2019, Nov. 27, 2019, pp. 1-8.

Vasilache et al., "Tensor Comprehensions: Framework-Agnostic High-Performance Machine Learning Abstractions," Facebook AI Research Technical Report, Feb. 13, 2018, pp. 1-39.

Xiao et al., "Gandiva: Introspective cluster scheduling for deep learning," 13th USENIX Symposium on Operating Systems Design and Implementation (OSDI '18), Oct. 8-10, 2018, pp. 595-610.

Yizhi Liu, "Remote Profile and Test Deep Learning Cross Compilation on Mobile Phones with TVM RPC," Apache TVM, Nov. 8, 2017, 6 pages.

You et al., "ImageNet Training in 24 Minutes," Oct. 16, 2017, 9 pages.

Yu et al., "Salus: Fine-Grained GPU Sharing Primitives for Deep Learning Applications," Computer Science, Feb. 12, 2019, pp. 1-15.

Gu, J. et al., Tiresias: A GPU Cluster Manager for Distributed Deep Learning, (Research Paper), 16th USENIX Symposium on Networked Systems Design and Implementation (NSDI '19), Feb. 26-28, 2019, 17 Pgs., Boston, MA, USA.

Peng, Y. et al., Optimus: An Efficient Dynamic Resource Scheduler for Deep Learning Clusters, (Research Paper), EuroSys '18: Thirteenth EuroSys Conference 2018, Apr. 23-26, 2018, 14 Pgs., ACM, Porto, Portugal.

Sukhoroslov, O. et al, Program Autotuning as a Service: Opportunities and Challenges, (Research Paper), 2016 IEEE/ACM 9th International Conference on Utility and Cloud Computing, Dec. 6-9, 2016, 8 Pgs., ACM, Shanghai, China.

Tillenius, M. et al., Resource-Aware Task Scheduling, (Research Paper), ACM Transactions on Embedded Computing Systems, Jan. 2015, 25 Pgs., vol. 14, No. 1, Article 5, ACM.

Zheng, L. et al., Ansor: Generating High-Performance Tensor Programs for Deep Learning, Proceedings of the 14th USENIX Symposium on Operating Systems Design and Implementation, Nov. 4-6, 2020, 18 Pgs, USENIX Association.

Bae, I., et al., Auto-Tuning CNNs for Coarse-Grained Reconfigurable Array-Based Accelerators, [received on Apr. 1, 2024], Retrieved from Internet :< https://Ieeexplore.IEEE.org/abstract/document/8412597> (Year: 2018).

Dhakal, A., et al., Spatial Sharing of GPU for Autotuning DNN models, [received on Apr. 1, 2024], Retrieved from Internet :< https://arxiv.org/abs/2008.03602> (Year: 2020).

Karcher, T., et al., Autotuning and Self-Adaptability in Concurrency Libraries, [received on 412024], Retrieved from Internet :< https://arxiv.org/abs/1405.2918> (Year: 2014).

(56) References Cited

OTHER PUBLICATIONS

Kwon, S., et al., Serialized Parallel Code Generation Framework for MPSoC, [received on Apr. 1, 2024], Retrieved from Internet :< https://dl.acm.org/doi/abs/10.1145/1698759.1698761 > (Year: 2010).

Liu, Y., et al., Optimizing CNN Model Inference on CPUs, [received on Apr. 1, 2024], Retrieved from Internet :< https://www.usenix.org/conference/atc19/presentation/liu-yizhi> (Year: 2019).

Narayanan, D., tal, Heterogeneity-Aware Cluster Scheduling Policies for Deep Learning Workloads, [received on Apr. 1, 2024], Retrieved from Internet :< https://www.usenix.org/conference/osdi20/presentation/narayanan-deepak> (Year: 2020).

Xing, Y., et al., An In-depth Comparison of Compilers for Deep Neural Networks on Hardware, [received on Apr. 1, 2024], Retrieved from Internet: < https://leeexplore.jeee.org/abstract/document/8782480> (Year: 2019).

\* cited by examiner

| CNN model | The number of layers |
|---|---|
| AlexNet | 8 |
| VGG16 | 16 |
| VGG19 | 19 |
| GoogleNet | 22 |
| ResNet50 | 18 |
| ResNet101 | 101 |
| ResNet152 | 152 |

FIG. 7

DEEP LEARNING AUTOTUNING TASK OPTIMIZATION

DESCRIPTION OF RELATED ART

Applications like industrial monitoring or autonomous driving that require real-time performance are increasingly powered by deep learning (DL) or other artificial intelligence models. Specialized hardware such as graphics processing units (GPUs), optimized central processing unit (CPUs), or field-programmable gate arrays (FPGAs) are employed to accelerate or speed up the computation-intensive inferences output by the DL or other artificial intelligence models. However, the models are often executed with device-specific, low-level optimizations to harness the hardware's full potential. Each of these hardware devices has different features such as specialized instructions, memory size and layout, caching, and parallelization support.

As such, the optimizations may vary parameters based on a variety of factors. These factors may include the hardware's relative ability to acquire and interpret information, speed in transferring information through different parts of the hardware, or the speed with which output from traditional processing cores or vector processing cores is transmitted for the processing logic. Estimating these inference optimizations are often performed manually, which is inefficient. The manual optimizations may also use processes that can miss some device-specific, low-level optimizations when the individual optimizing the accelerator fails to have a deep knowledge of the hardware.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 7 illustrates scheduling a single autotune task, in accordance with embodiments of the application.

Figure 1A:
FIGS. 1A-1B provides examples of autotuning infrastructure, in accordance with embodiments of the application.

The figures are not exhaustive and do not limit the present disclosure to the precise form disclosed.

DETAILED DESCRIPTION

Embodiments described herein can improve hardware-specific tuning procedures to extract maximum performance from available infrastructure resources. Automated performance optimization, called autotuning, creates optimized low-level implementations for specific hardware to improve inference performance without the need for human experts in a vendor-agnostic way. Specifically, autotuning finds optimal configurations for loop tiles, which may be one combination of tunable parameters available for the specific hardware. The ordering, caching, and loop unrolling may be configured in an optimal configuration to reduce memory access cost, maximize parallelism (e.g., CUDA threading), and leverage novel hardware primitives (e.g., Tensor Cores) for specific hardware.

For example, autotuning may define a design space and code template. The design space may correspond with tunable parameters of the specific hardware. The code template may include all potential tunable parameters, alone or in combination with each other, including a tile number (e.g., tile_f, tile_y, tile_x, etc.), tile and binding information for a number of filters, height, and width of a feature map, tile and binding information for the reduction axis (e.g., channels, height, width of filters, etc.), "auto_unroll_max_step" corresponding with a threshold value of the number of steps in a loop to be automatically unrolled during code generation, and "unroll_explicit" corresponding with an explicit hint for the code generation phase to unroll the loop. The autotuning system may generate an executable file from the selected combination of tunable parameters with the code template. The selected combination may include loop tiles, ordering, and/or caching for implementation. The autotuning system may repeat these procedures until it finds an optimal configuration. For example, the autotuning system may measure performance of the generated executable files from each combination of tunable parameters.

These operations may directly affect the efficiency of a machine learning (ML) or other artificial intelligence (AI) inference computation. For example, several ML and AI computations are matrix operations (e.g., adding and multiplication) and the speed of these operations, in the aggregate, effect the overall computation time of the system. Since loop tiles, ordering, and caching may decide the performance of inference computation on the specialized hardware, finding an optimal configuration may be important in increasing the overall efficiency of the system.

In the context of deep learning, autotuning a deep learning model refers to optimizing the model to improve its efficiency when run on a particular hardware architecture, like a particular type of graphics processing unit (GPU) or central processing unit (CPU). In addition, autotuning optimizes each trained model for specific hardware according to specific configuration parameters (e.g., quantization, autotuner types, etc.). Unlike manual optimizations, autotuning fosters innovation and helps manage the increasing performance demands for a growing variety of models and accelerator devices.

In autotuning frameworks, these processes find an optimal low-level implementation using sequential operations consisting of four stages before finding the optimal one. The first stage may select a batch of candidate implementations. For example, the process may select a batch of candidates in searching spaces based on results from exploration algorithms with ML cost model managed in update cost model stages. In case no initial training data exists, it may pick random candidates. The second stage may comprise a build stage. For example, the process may generate one or more executable files based on the batch of candidates. The third stage may comprise a profile stage that can run the one or more executable files and measure execution time on target devices. The fourth stage may update the model and use machine learning (ML) and/or a search exploration algorithm to find next promising configuration candidates.

While existing autotuning frameworks may exhibit good inference performance, they have fundamental design limitations on autotuning procedures. For example, in existing frameworks, autotuning procedures are iteratively executed as sequential operations in asynchronous stages. Moreover, these sequential operations can be run on different computation resources. However, when such sequential autotuning procedures are run on different computation resources (e.g., a CPU, a GPU, etc.), inefficient computation resource utilization can result. In particular, since each stage has strong dependencies, one of the computation resources is always idle in existing autotuning frameworks. For example, while performing the third stage (e.g., profile stage) on a GPU, a CPU resource is idle since the fourth stage (e.g., update stage) performed on the CPU requires output data from the third stage.

To avoid this resource utilization inefficiency, multiple autotuning tasks may be run on the same resources. In general, a task may comprise a process run unto the hardware of the device handled by a runtime system, rather than application layer software, including data dependencies. If the tasks are not carefully scheduled, however, performance degradation occurs due to task interference. Further, since existing autotuning frameworks have a rigid and monolithic design, which continuously iterates each stage based on initial autotuning configurations, there may be limited ability to coordinate different autotuning tasks until the whole autotuning task is complete.

Embodiments of the disclosure address the aforementioned limitations of existing autotuning frameworks by providing a redesigned autotuning framework that maximizes resource utilization, decreases total autotuning completion time, and decreases the cost of autotuning. Embodiments of the disclosure achieve this, at least in part, by decomposing the existing monolithic and rigid autotuning process into a set of functional sub-procedures and scheduling the functional sub-procedures such that stages requiring different resources are scheduled simultaneously. Exclusive resource access may be guaranteed for only one stage at a time for a particular resource in order to avoid incorrect profiling measurement and performance degradation due to interference.

Some embodiments of the disclosure may include a system that comprises a task launcher, a scheduler, and an agent to launch, schedule, and execute decomposed autotuning stages, respectively. The scheduling policy implemented by the scheduler may perform operations beyond a simple scheduling policy (e.g., a FIFO-based scheduling policy), which produces a high queuing delay. By leveraging autotuning specific domain knowledge (e.g., the states of autotuning tasks and resources, and their relationships), this may help reduce queuing delay and improve resource utilization that is otherwise found in traditional systems. For example, the scheduler may achieve this in three ways: 1) leveraging fine-grained domain knowledge (e.g., the cost of each stage in terms of execution time, update model interval, and queue status) with a Shortest Job First (SJF) scheduling policy to mitigate long queuing delay, 2) dynamically adjusting parameters for each stage to reduce queuing delay, and 3) leveraging a hardware-based Multi-Process Service (MPS) capability to help guarantee the isolation of active threads from multiple GPU applications, to multiplex one GPU for multiple profile stages (e.g., in case the inference service is deployed on shared GPU, etc.).

In example embodiments of the disclosure, the scheduler may accept initial autotuning options from a job manager and may generate a schedule of autotuning tasks based on the initial autotuning options. Iteratively, the scheduler can schedule multiple layers in multiple or single autotuning job(s) in parallel to update and improve autotuning across. Additional detail of the task launcher, scheduler, and agent are provided throughout the disclosure.

Figure 1B:
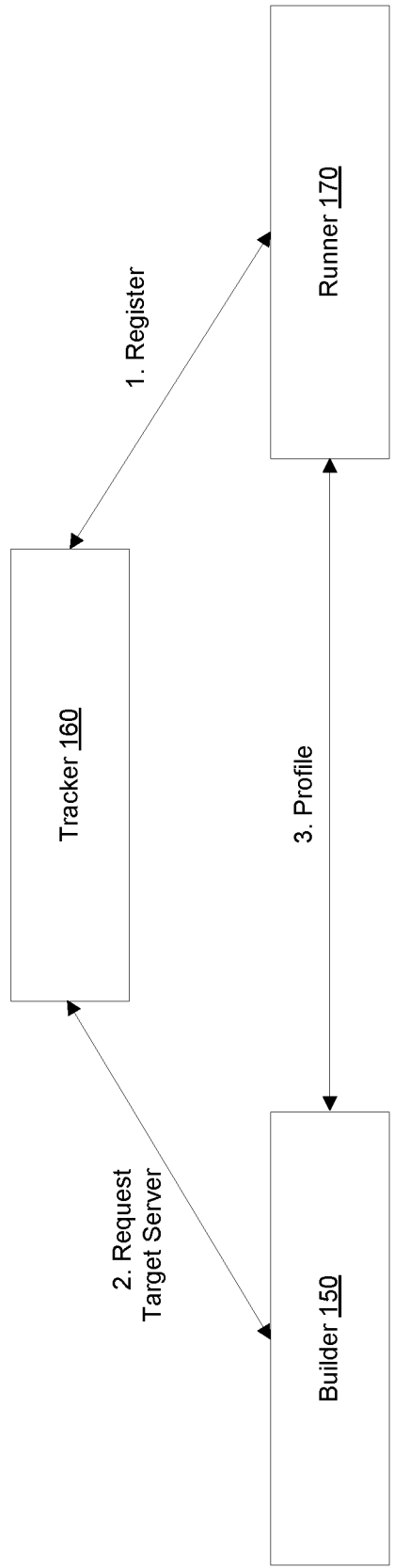

FIGS. 1A-1B provides examples of autotuning infrastructure. FIG. 1A illustrates a machine learning (ML) lifecycle. The lifecycle may start with training 110 the ML model. This may generate a ML model based on data. To improve the inference performance (e.g., low execution time of ML inference), inference optimization 120 may be implemented based on the ML trained model generated from training 110. Inference optimization 120 may be implemented before deploying an ML inference phase for specific target device and may include autotuning. In inference optimization 120, high-level transformations rewrite the computation graph by, for example, fusing tensor operators, pre-computing constant parts, or transforming the data layout in memory. These high-level graph optimization may be first applied and then an optimal low-level implementation for the modified graph is performed on the specific hardware. The last phase is inference 130, which serves inference requests based on the trained model and autotuning.

FIG. 1B illustrates a sample autotuning infrastructure of inference optimization 120 that can comprise three components: builder 150, tracker 160, and runner 170. Builder 150, tracker 160, and runner 170 may cooperate to complete an autotuning task. For example, the autotuning framework performed by these components may include four stages as discussed herein. The first stage may select a batch of candidate implementations. For example, the process may select a batch of candidates in searching spaces based on results from exploration algorithms with ML cost model managed in update cost model stages. In case no initial training data exists, it may pick random candidates. The second stage may comprise a build stage. For example, the process may generate one or more executable files based on the batch of candidates. The third stage may comprise a profile stage that can run the one or more executable files and measure execution time on target devices. The fourth stage may update the model and use machine learning (ML) and/or a search exploration algorithm to find next promising configuration candidates.

Builder 150 may perform the first, second, and forth stages and runner 170 may perform the third stage. Tracker 160 may track resource availability (e.g., GPU) in runner 170 and help builder 150 discover unused resources for profiling. When runner 170 is started on target devices, runner 170 may contact tracker 160 and are registered in tracker 160. Then, tracker 160 matches incoming requests from builder 150 and assigns available resources to builder 150 using a FIFO-based scheduling algorithm.

The autotuning procedure illustrated with FIGS. 1A-1B is monolithic and continuously iterates each stage based on initial autotuning configurations (e.g., models, hardware, quantization) until the whole autotuning task is completed. These monolithic and sequential stages may make fine-grained management and deployment of autotuning stages infeasible. As such, in some embodiments of the disclosure, an improved autotuning process is described that decomposes these components and processes (e.g., builder 150, tracker 160, and runner 170) into a set of functional sub-procedures and scheduling the functional sub-procedures such that stages requiring different resources are scheduled simultaneously to optimize and improve the automated autotuning process.

Figure 2:
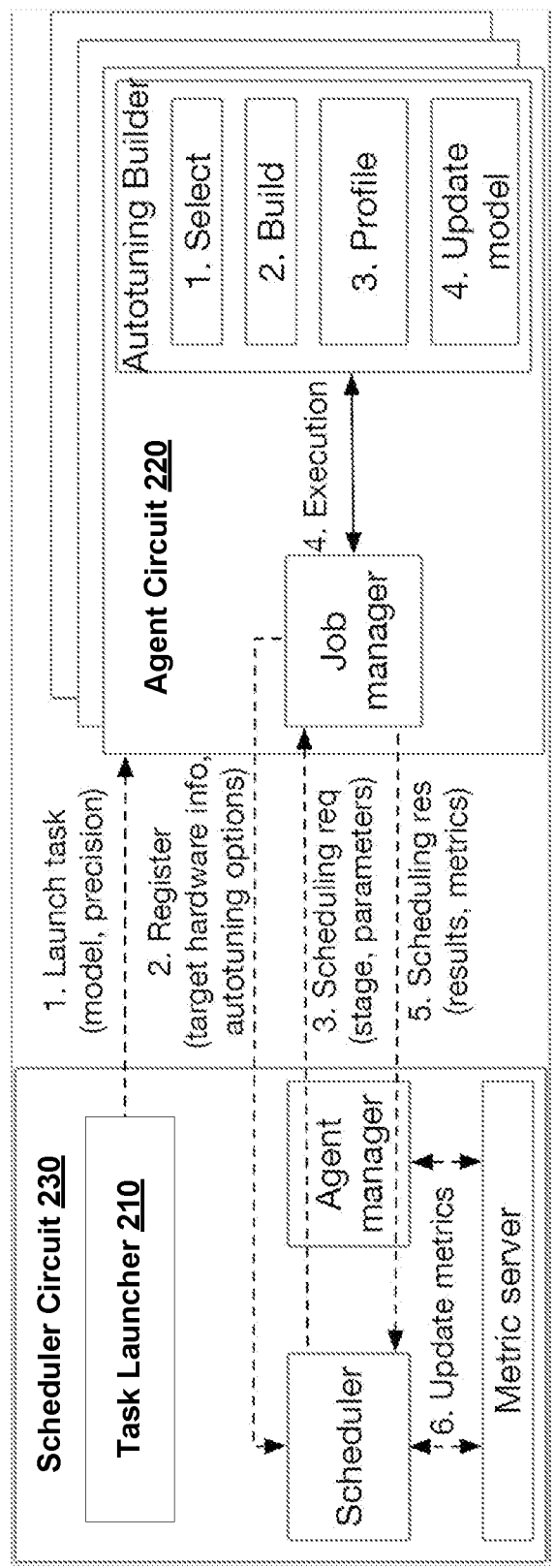
FIG. 2 provides an alternative example of an autotuning infrastructure, in accordance with embodiments of the application.

FIG. 2 provides an alternative example of an autotuning infrastructure, in accordance with embodiments of the application. The autotuning infrastructure may be decomposed to schedulable units, including scheduler circuit 230 and agent circuit 220 to launch, schedule, and execute decomposed autotuning stages. In some examples, scheduler circuit 230 may implement task launcher circuit 210 internally to scheduler circuit 230, or may be external (e.g., called service or device, etc.). The decomposition of scheduler circuit 230 and agent circuit 220 can enable communication between each stage and scheduler circuit 230 to exchange the metrics or other information, along with dynamic adjustments of each stage (e.g., an interval for update model and the number of profiling, etc.) to help realize context-aware autotuning scheduling.

Task launcher circuit 210 is configured to submit a task or job to agent circuit 220. Task launcher circuit 210 may reside with scheduler circuit 230 to start launching a task on agent circuit 220 based on computation resource availability information, which can be determined and/or stored by scheduler circuit 230.

Agent circuit 220 may run on the resource (e.g., device with a GPU or CPU, etc.) and act as a mediator between the resource and the autotuning infrastructure, including scheduler circuit 230. Agent circuit 220 may enable task launcher circuit 210 to submit and manage computations on the resource.

Agent circuit 220 may manage a network connection between multiple circuits, including agent circuit 220 and scheduler circuit 230.

In some examples, task launcher circuit 210 may receive one or more autotuning requests from users. Task launcher circuit 210 and scheduler circuit 230 may exchange information to find available resources (e.g., specified hardware including GPU, etc.). Task launcher circuit 210 may send a job launching request to agent circuit 220 with parameters (e.g., DNN model, precision (e.g., float32, float8, int), etc.).

Agent circuit 220 may receive an autotune task from task launcher circuit 210 and add information to a request with the autotune task. For example, since agent circuit 220 is located at the resource, agent circuit 220 can access hardware or software information about the resource and included it with the request. The information may include information about the GPU and/or autotune options. As illustrative examples, agent circuit 220 may include GPU specific information (e.g., "max_shared_memory_per_block," "max_threads_per_block," "max_thread_x," "max_thread_y," "max_thread_z," "cuda_arch," "sm_50," etc.) and/or autotuning specific parameters (e.g., interval for "update model" stage, a number of layers in the model, a search space corresponding with the models, a number of building executable and profiling stages that are running at the same time, etc.), and the like.

Agent circuit 220 may transmit the request to scheduler circuit 230 to start the autotuning task register, as well as receive a response from scheduler circuit 230.

Agent circuit 220 may comprise a job manager. The job manager at agent circuit 220 of the resource may receive a scheduling request message associated with the scheduling of the tasks from the scheduler circuit 230. The scheduling request message may comprise the stage of autotuning which will be executed by the job manager at agent circuit 220. After execution of the stage, the job manager at agent circuit 220 sends a scheduling response message including a success or failure of the execution and the time to run those pages to scheduler circuit 230.

Scheduler circuit 230 may implement a scheduling policy beyond a simple scheduling policy (e.g., first-in-first-out (FIFO), etc.) to reduce a high queuing delay. The delay may correspond with autotuning specific domain knowledge. The domain knowledge may include the states of autotuning tasks and resources and their relationships identified by agent circuit 220.

Scheduler circuit 230 is a context-aware autotuning scheduler that manages the decomposed schedulable units and different computation resources (e.g., CPU, GPU) from multiple or single autotuning tasks. To be context-aware, scheduler circuit 230 receives the states of autotuning tasks (e.g., current stage, average runtime per stage) and resources (e.g., GPU, CPU availability) as well as their relationships (i.e., mapping each stage to specific resources). To keep track of context, scheduler circuit 230 and agent circuit 220 transmit and share information to give scheduler circuit 230 a global view of multiple autotuning tasks.

Scheduler circuit 230 may schedule a next stage (e.g., select, build, profile, and update) for the autotuning tasks and job manager at agent circuit 220 may maintain these configurations. Scheduler circuit 230 may schedule each stage of autotuning tasks based in part on the execution times returned for each stage. Job manager at agent circuit 220 may execute the stage scheduled from scheduler circuit 230.

In the looping procedure, the system may form a multi-autotune state into the full procedure and scheduler circuit 230 may schedule the task based on the resource availability and other autotuning work. Scheduler circuit 230 may guaranty an exclusive access to resource in order to run each task on the resource in full. Additional detail is provided with FIGS. 4-6.

Scheduler circuit 230 may leverage autotuning specific knowledge (e.g., the states of autotuning tasks and resources as well as their relationships) to improve resource utilization and significantly reduce queuing delay. Scheduler circuit 230 obtains autotuning-specific domain context, including a scheduled stage, parameter to run the stage, and fine-grained metrics from agent circuit 220 to make optimal scheduling decisions based on them.

Scheduler circuit 230 may reduce queuing delay and improve resource utilization by 1) leveraging fine-grained domain knowledge (e.g., the cost of each stage in terms of execution time, update model interval, and queue status) with a Shortest Job First (SJF) scheduling policy to mitigate long queuing delay, 2) dynamically adjusting parameters for each stage to reduce queuing delay, and 3) leveraging a hardware-based Multi-Process Service (MPS) capability to help guarantee the isolation of active threads from multiple GPU applications, to multiplex one GPU for multiple profile stages in case the inference service is deployed on a shared GPU.

In some examples, multiple autotuning tasks may be scheduled, as illustrated with blocks 1-5 in FIG. 2.

At block 1, task launcher circuit 210 may receive a new autotuning task. Task launcher circuit 210 may launch the autotuning task by transmitting an electronic communication to agent circuit 220. Task launcher circuit 210 sends information (e.g., autotuned Deep Neural Network (DNN) model, precision (e.g., float32, float8, int)) to agent circuit 220.

At block 2, agent circuit 220 may register a new job with scheduler circuit 230. The job manager in agent circuit 220 may send a registration request with autotuning options to scheduler circuit 230. The autotuning options may include, for example, autotuning specific parameters (e.g., interval for "update model" stage, the number of layers in the model, and search space of models, the number of building executable and profiling at the same time, etc.). In some examples, the model and quantization information are sent from task launcher circuit 210 to agent circuit 220.

At block 3, scheduler circuit 230 may start scheduling a new job based on current scheduling policy (e.g., FIFO, SJF, etc.). When a new task is scheduled, the scheduling request from scheduler circuit 230 to agent circuit 220 is sent to the job manager in agent circuit 220. If an autotuning task is required to adjust autotuning parameters (e.g., an interval for update model) for more efficient scheduling multiple autotuning tasks, those information may also be included in the scheduling request.

At block 4, the job manager in agent circuit 220 may execute the functionality decomposed sub-procedure based on the scheduling request.

At block 5, agent circuit 220 and scheduler circuit 230 may update autotuning task metrics. Blocks 3-5 may be repeated for each submitted autotuning task.

Dynamic parameters may be implemented for adjusting an autotuning task, including the number of profiling and generating executable files, and interval for update model operating retraining and exploration. For example, when an autotuning task is started, it is configured with several inputs for each stage (e.g., an interval for update model, the number of profiling and generating executable files, etc.). In traditional systems, the inputs may be permanent until the completion of autotuning task. This causes a Head-Of-Line (HOL) blocking problem, when there are many tasks in target device queue (e.g., GPUs) for profile stage. For example, when two autotuning tasks wait for running profile stage on one GPU resource, the second task should wait for the completion of profile stage from the first task. During this time, CPU resource is idle. In some embodiments described herein, dynamic parameters are implemented to address this issue. The parameters may be dynamically adjusted by considering a stage of tasks and queue's status. Scheduler circuit 230 may send profile scheduling information with a small number of profiling to the first task. The first task may complete the profile stage earlier than the previous profile stage and utilizes CPU resource. At the same time, the second task takes GPU resource early to run profile stage. Therefore, overall resource utilization increases, which results in reducing the total autotuning completion time for multiple tasks.

In some examples, GPUs may be shared for multiple profiling in addition to exclusive access to target devices (e.g., GPUs) for a profile stage and CPU for other stages. The exclusive access to target devices may help ensure correct measurement results by avoiding interferences from other profile stages and performance degradation. While the system may guarantee exclusive access to target devices, which may help ensure correct measurement results by avoiding interferences from other profile stages and performance degradation, in some examples, GPUs may be shared for multiple profiling in addition to exclusive access to target devices (e.g., GPUs) for a profile stage. This may be useful when the autotuned model for inference service is deployed on a shared GPU.

In some examples, a hardware-based Multi-Process Service (MPS) may be implemented to isolate computation resource (i.e., active threads percentage) between different applications on one GPU. Multiple profile stages may be run at the same time to increase target resource utilization and reduce autotuning completion time. For example, scheduler circuit 230 may be configured to determine the target device's configuration on MPS-enabled target devices. Scheduler circuit 230 may consider multiple logical GPUs partitioned by active threads percentage from an MPS-enabled GPU as separate GPU resources and schedule multiple profile stages to the logical GPUs.

In some examples, a Short Job First (SJF)-based context-aware scheduler may be implemented as scheduler circuit 230 rather than a FIFO-based scheduler. This may reduce a queuing delay caused by a Head-Of-Line (HOL) blocking problem. For example, the system may correspond with strong procedure-dependency (i.e., select, build, profile, and update model) in autotuning tasks and their different execution time. When two autotuning tasks wait for running update model stage on one CPU resource, the second stage may wait for the completion of update model stage from the first stage. When the update model stage is over in the first stage, the second stage occupied the CPU resource, which blocks proceeding the first stage to use GPU resource for profiling stage since the first stage should first complete select and build stages. Both stages require much shorter time than update model stage when update model performs model retraining and exploration algorithm. Since the FIFO-based scheduler does not consider this fine-grained context, it causes a HOL blocking problem, which results in increasing queuing delay for the autotuning and resource idle time.

To address this problem, scheduler circuit 230 may be implemented as a Short Job First (SJF)-based context-aware scheduler. The SJF-based context-aware scheduler may prioritize some stages requiring a short completion time over stages with long completion time. Sample code is provided herein to illustrate the SJF-based context-aware scheduler.

```
GPUJobQueue = []
CPUJobQueue = []
while True:
#Waiting Job Completion
   Client := DoneStage:
   UpdateMetrics(Client)
if Client.stage == Profile then
   GPUJobQueue.ENQUEUE(Client)
# Preempt jobs based on context to avoid HOL blocking issues
else if Client.stage == (Select or Build) AND
   CPUJobQueue.DEQUEUE().stage == UpdateModel then
      CPUJobQueue.ENQUEUEATFIRST(Client)
else
   CPUJobQueue.ENQUEUE(Client)
if (No active job in CPUJobQueue)
   Client = CPUJobQueue.DEQUEUE()
   executeStage(Client)
if (No active job in GPUJobQueue)
   Client = GPUJobQueue.DEQUEUE()
   executeStage(Client)
```

The SJF-based context-aware scheduler may leverage fine-grained context, for example, an interval of update model and queueing status in addition course-grained context (e.g., current stage of autotuning tasks, required resource for the stage, and resource availability.) The SJF-based context-aware scheduler allows preemption for the task of lastly completed stage in case the lastly completed stage is profile stage and the stage of first ready task in the queue is update model which will perform retraining and exploration algorithm. So, the select and build stages of the lastly completed task are scheduled first. After the execution of two stages, the task is scheduled for profile on GPU and the preempted task starts update model on CPU resource at the same time. This may effectively avoid a long queueing delay.

Figure 3:
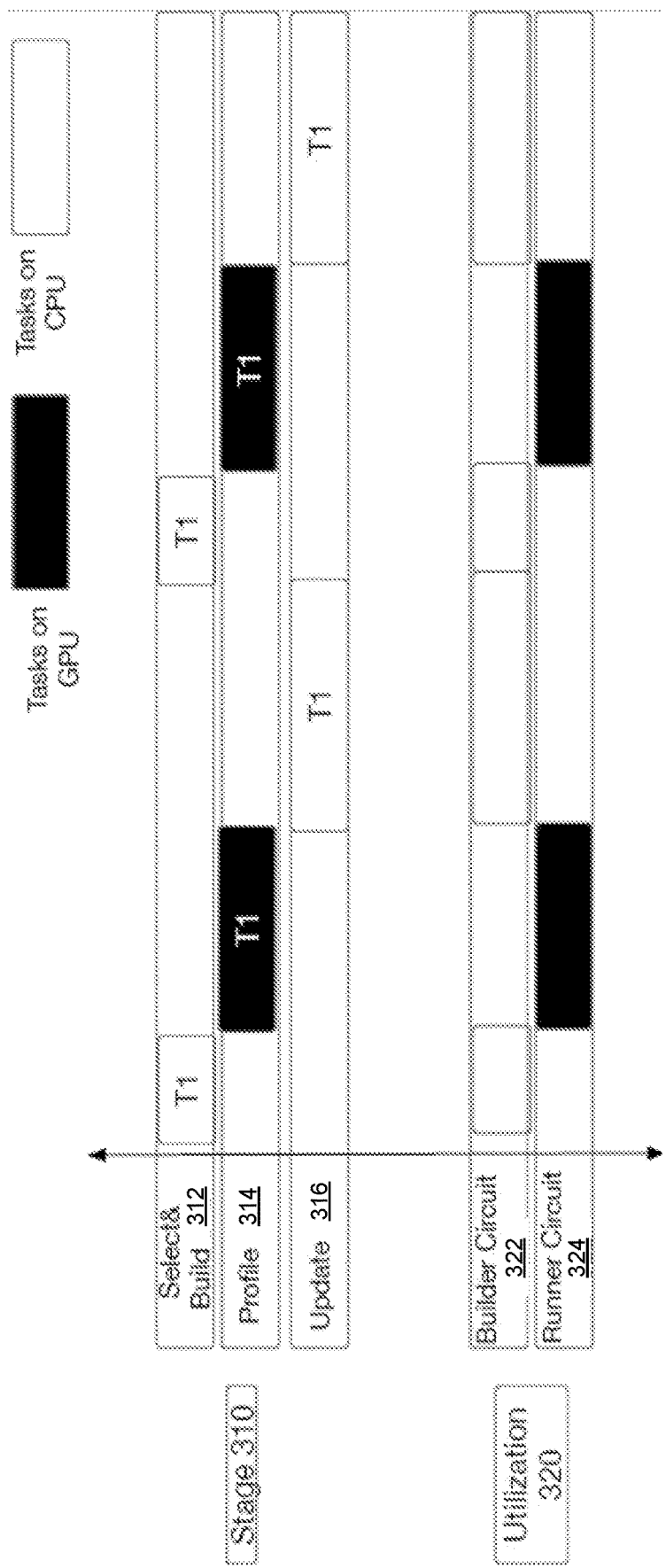
FIG. 3 illustrates autotuning and high level resource utilization, in accordance with embodiments of the application.

FIG. 3 illustrates autotuning and high level resource utilization, in accordance with embodiments of the application. For example, FIG. 3 may illustrate a resource idle time due to strong dependency between stage in one autotuning task in traditional autotuning system. This may highlight resource inefficiency (e.g., long idle time) in traditional autotuning system when running only one autotuning task.

Stages 310 of a traditional autotuning system, select and build stages 312, profile stage 314, and update stage 316, are shown in comparison with resource utilization 320. For example, in traditional autotuning systems, stages 310 may be run sequentially by builder circuit 322 and runner circuit 324 to implement autotuning for CPU and GPU devices. When builder circuit 322 finishes processing build stage 312, runner circuit 324 may initialize processing of profile stage 314, where each stage starts after the previous stages has ended.

Figure 4:
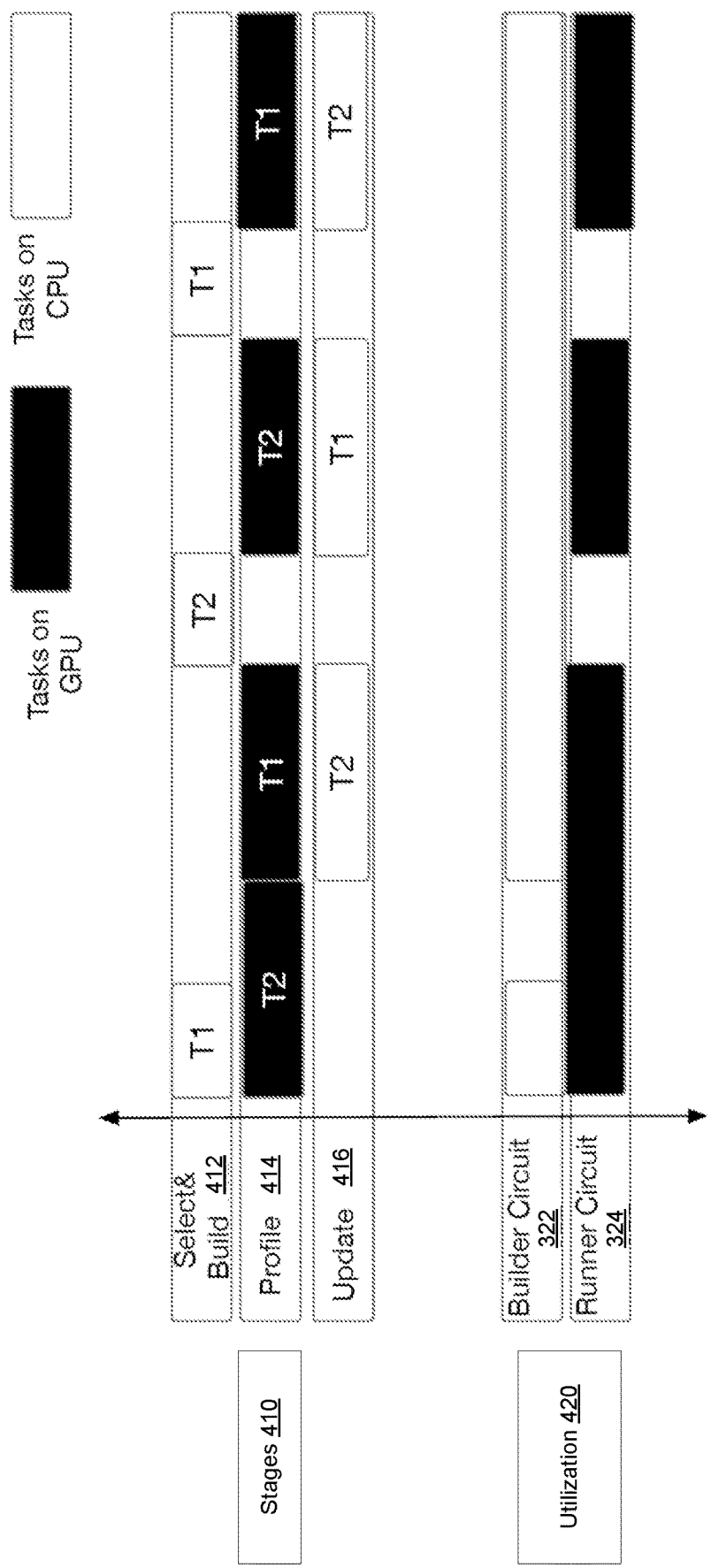
FIG. 4 provides autotuning and high level resource utilization, in accordance with embodiments of the application.

FIG. 4 provides autotuning and high level resource utilization, in accordance with embodiments of the application. For example, FIG. 4 may include an illustrative solution to resolve the inefficiency shown in FIG. 3. This may include interleaving multiple autotuning tasks (or multiple layers from one autotuning task) with an exclusive and shortest job first scheduler.

Stages 410 of an improved autotuning system that supports interleaving are shown in comparison with resource utilization 420. As illustrated in FIG. 4, two simultaneous autotuning T1 and T2 tasks are available in scheduler circuit 230. Scheduler circuit 230 may correlate the tasks for each stage with the available resources. For example, select and build stages 412, profile stage 414, and update stage 416 of each task may be run with interleaving to implement autotuning for CPU and GPU devices. The scheduling of tasks may be aware of task loads to determine which task is in which stage and which task will use each resource (e.g., based on agent circuit 220 correspondence and profiles, etc.). The interleaved stages may be implemented on available resources, as determined by scheduler circuit 230. In some examples, the dependencies between stages 410 may be maintained.

Figure 5:
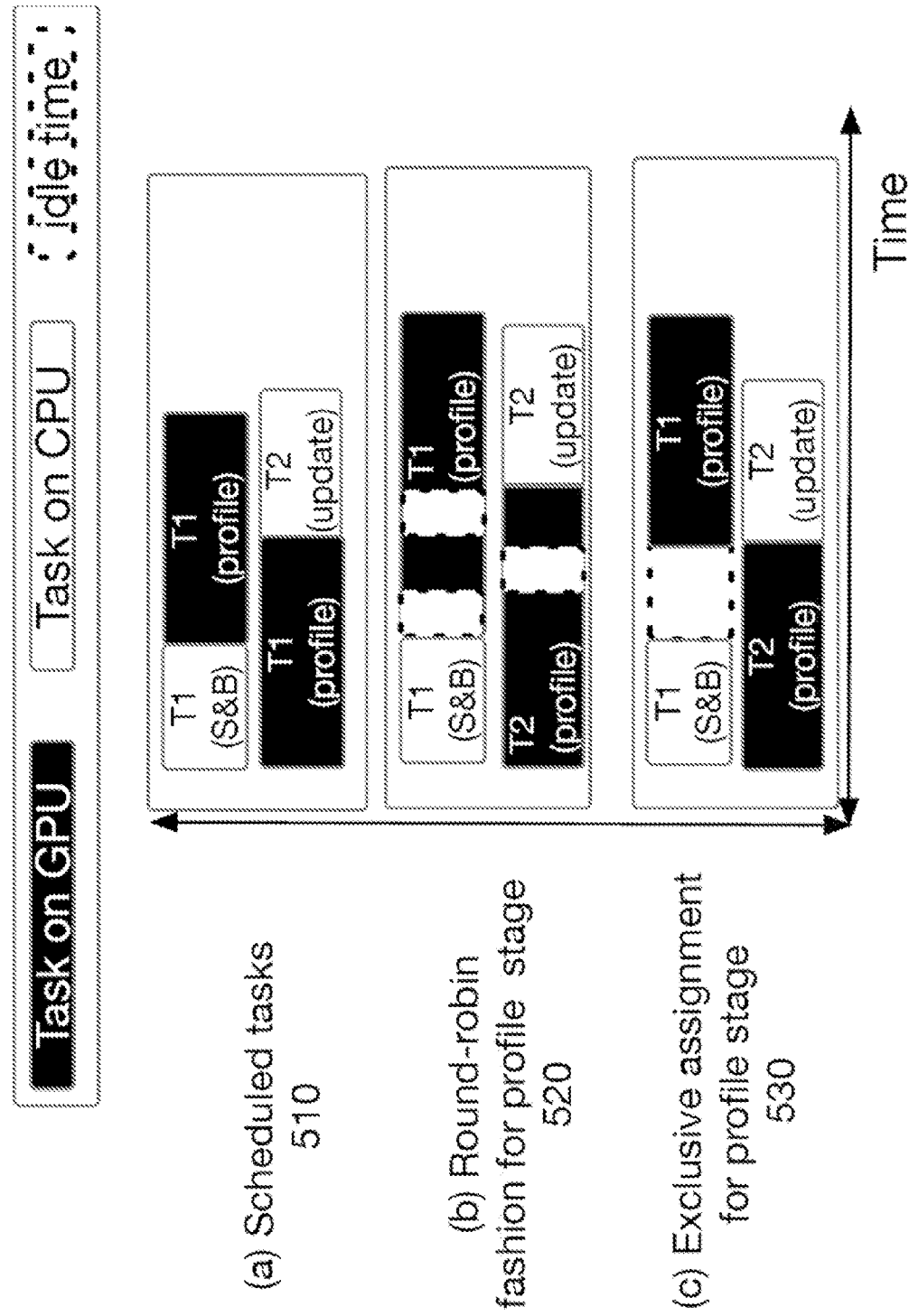
FIG. 5 illustrates exclusive access of a scheduler circuit to resources, in accordance with embodiments of the application.
Figure 6:
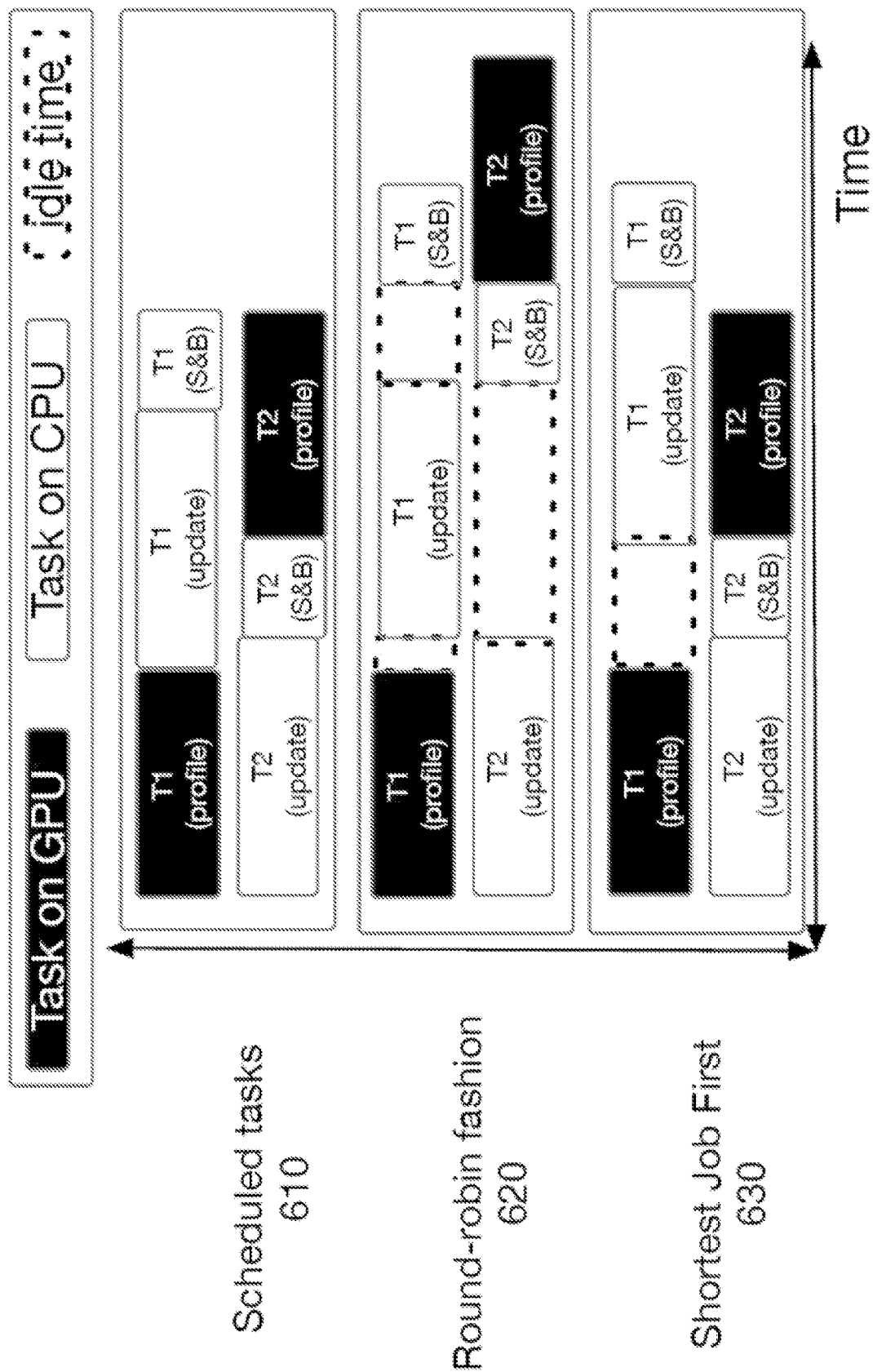
FIG. 6 illustrates shortest job first (SJF) of a scheduler circuit to resources, in accordance with embodiments of the application.

In FIG. 5 and FIG. 6, a round-robin fashion may be illustrated. In the round-robin fashion (e.g., time sharing of GPU resource), multiple autotuning tasks scheduled in traditional systems may cause high idle time. This may be compared with an approach to use exclusive and SJF assignments. The idle time may be reduced and resource utilization may be improved.

FIG. 5 illustrates exclusive access of a scheduler circuit to resources, in accordance with embodiments of the application. For example, scheduling circuit 230 may guarantee exclusive access to resources for one stage to avoid incorrect profiling measurement and performance degradation due to interference. As illustrated in FIG. 5, two simultaneous autotuning tasks are available for scheduling 510, T1 and T2. The different shading of the boxes shows which resources will run the tasks, in accordance with the legend of FIG. 5, and the first and second rows may correspond with scheduled stages (e.g., profile, update, etc.) of each task.

Two types of scheduling are available, including a round-robin fashion 520 and an exclusive assignment 530. In a round-robin fashion 520, the tasks are run on the resources with significant idle time for each resource. After the build stage, T1 should run the next task on the next resource, but without the exclusive access, the tasks may share the GPU resource time with a time multiplexing (e.g., to run profile stage). This may cause idle time for each task, T2 and T1, in order to complete the profile stage. In another example, exclusive assignment 530 may be implemented (e.g., for profiling stage). Instead of implementing the time multiplexing for the GPU resource, T1 is waiting for completion of the T2 profiling state, because the scheduler does not allow timesharing. The illustration of resource utilization only includes a brief idle time, but both will continue their job on different resources. As shown, exclusive assignment 530 may comprise less idle time than round-robin fashion 520. This may take less time to complete autotuning tasks and with high resource utilization. For example, the illustration in FIG. 5 shows an end of the rectangle in exclusive assignment 530 being shorter than the end of rectangle in round-robin assignment 520.

FIG. 6 illustrates shortest job first of a scheduler circuit to resources, in accordance with embodiments of the application. For example, scheduling circuit 230 may implement shortest job first (SJF) to prioritize some stages requiring short completion time over stages with long completion time. This may allow scheduling circuit 230 to leverage fine-grained context, for example, an interval of update model and queueing status in addition to course-grained context (e.g., current stage of autotuning tasks, required resource for the stage, and resource availability).

The SJF-based context-aware scheduler may allow preemption for the task of lastly completed stage in case the lastly completed stage is profile stage and the stage of first ready task in the queue is update model which will perform retraining and exploration algorithm. In some examples, the select and build stages of the lastly completed task may be scheduled first. After the execution of two stages, the task is scheduled for profile on GPU and the preempted task starts update model on CPU resource at the same time. With SJF-based context-aware scheduler, scheduling circuit 230 effectively avoids long queueing delay.

In some examples, the scheduling approaches to reduce resource idle time and avoid interference from sharing resources among multiple autotuning tasks at the same time apply for other use cases that require the sequential executions on different resources (e.g., CPU, GPU) to complete their application. In some examples, other sophisticated scheduling approaches (e.g., machine learning-based scheduling) can be used to maximize resource utilization but keep the autotuning completion time low, without diverting from the disclosure.

As illustrated in FIG. 6, two autotuning tasks may be available for scheduling 610, including T1 at a profile stage and T2 at an update stage. The tasks may be scheduled using different processes, including round-robin fashion 620 and shortest job first (SJF) 630. In either of the scheduling implementations, the update stage may be estimated to take longer than other stages and the profile stage may take less time than the update stage, as illustrated in the length of each rectangle.

In round-robin fashion 620, scheduling circuit 230 may schedule the tasks as they appear in the request queue. The estimated time duration for completing the task (e.g., as identified by agent circuit 220) may be irrelevant in scheduling these tasks.

In shortest job first (SJF) 630, scheduling circuit 230 may schedule the shorter task before a task that is estimated to take a longer time (e.g., as identified by agent circuit 220). In this example, the scheduling task with the longer estimated processing time update stage in T1 may be schedule after the completion of select and build stage in T2. While update stage in T1 is queued in scheduling circuit 230 earlier than select and build stage in T2, the scheduling circuit 230 schedule stage in T2 first. With this scheduling, T1 and T2 can leverage the CPU and GPU resource for update and profile in parallel. Compared to round-robin approach, SJF shows less resource idle time and short autotuning completion time.

FIG. 7 illustrates the number of layers in each convolutional neural network (CNN) model. For example, each layer in one deep learning (DL) model is independent for autotuning, the system may start autotuning for each layer at the same time, while it may not fully leverage transfer learning in ML-cost model between layers. The system may receive only one submitted autotuning task. As described herein, scheduler circuit 230 may interact with agent circuit 220 to run autotuning for multiple layers at the same time from the autotuning task and schedule them.

Figure 8:
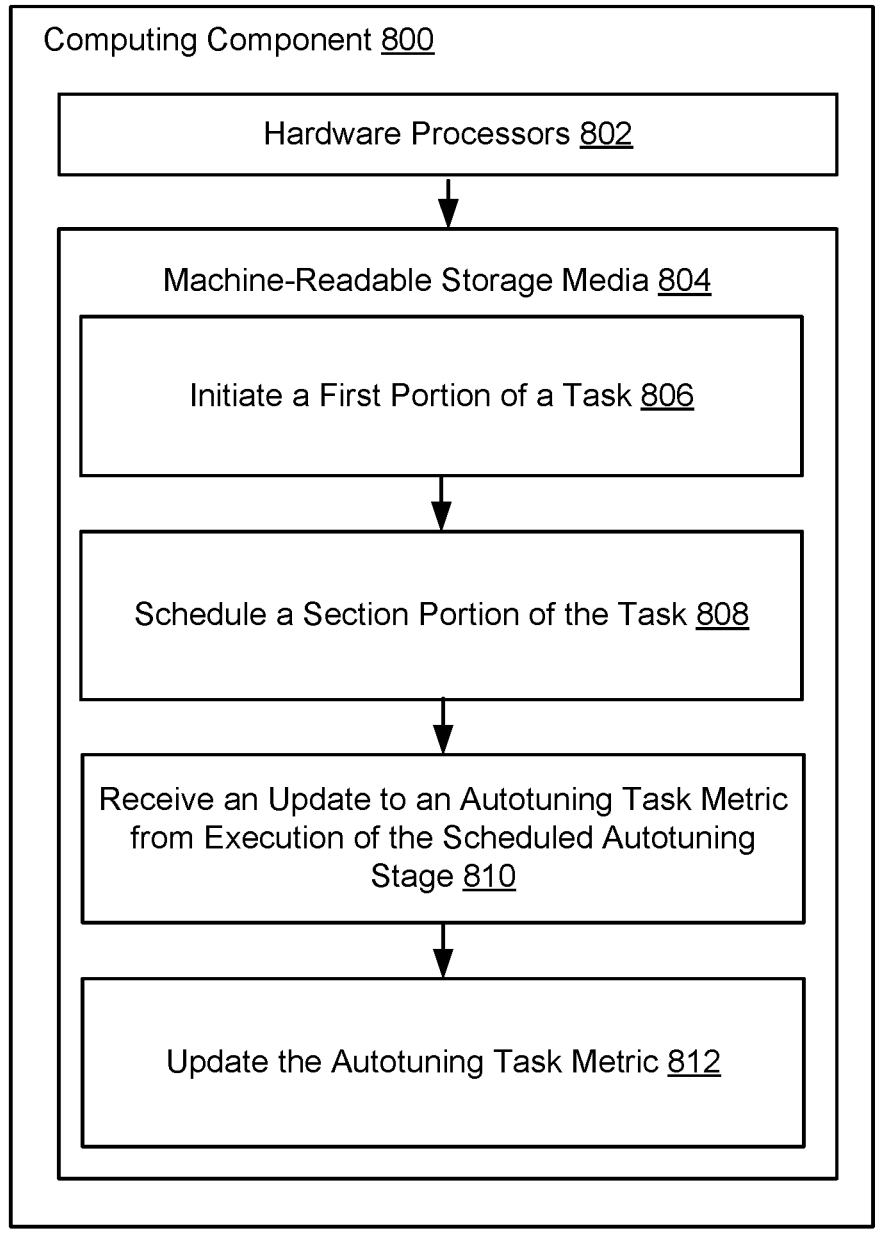
FIG. 8 illustrates a computing component for providing dynamic autotuning procedures, in accordance with embodiments of the application.

FIG. 8 illustrates an example iterative process performed by a computing component 800 for providing dynamic autotuning procedures. Computing component 800 may be, for example, a server computer, a controller, or any other similar computing component capable of processing data. In the example implementation of FIG. 8, the computing component 800 includes a hardware processor 802, and machine-readable storage medium 804. In some embodiments, computing component 800 may be an embodiment of a system including task launcher circuit 210, agent circuit, and/or scheduler circuit 230 of FIG. 2.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-812, to control processes or operations for optimizing the system during run-time. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-812.

In some examples, instructions 806-812 may be implemented by a computer system for performing a set of autotuning tasks with respect to a machine learning (ML) model. The computer system may comprise a memory storing a scheduler circuit, wherein the scheduler circuit operates in accordance with machine executable instructions (e.g., instructions 806-812) and one or more processors configured to access the memory and execute the machine readable instructions.

Hardware processor 802 may execute instruction 806 to initiate a first portion of a task. The task may be initiated with a GPU or CPU based on a scheduling policy.

Hardware processor 802 may execute instruction 808 to schedule a second portion of the task. The task may be scheduled with the GPU or the CPU based on the scheduling policy. In some examples, the scheduling utilizes the GPU or the CPU while the GPU or the CPU is not in use from the first portion of the task.

Hardware processor 802 may execute instruction 810 to receive an update (e.g., one update, multiple updates, etc.) to an autotuning task metric (e.g., one autotuning task metric, multiple autotuning task metrics, etc.) from the execution of the scheduled autotuning stage. The receiving may be based upon a job manager of the computer system executing a scheduled stage and measuring the execution time associated with execution of the scheduled autotuning stage. The scheduled autotuning stage may comprise a select stage, a build stage, a profile stage, or an update stage.

Hardware processor 802 may execute instruction 812 to update the autotuning task metric(s) based at least in part on the received update(s).

In some examples, the computer system is configured to optimize inference performance of a machine learning (ML) model for a particular hardware configuration.

In some examples, the machine readable instructions further receive, by the scheduler circuit from the job manager, a registration request with autotuning options.

In some examples, the scheduler circuit utilizes exclusive resource access for only one stage at a time for a particular resource.

In some examples, the scheduler circuit utilizes shortest job first (SJF) to prioritize a first stage requiring short completion time over a second stage with longer completion time.

In some examples, a Multi-Process Service (MPS) is implemented to isolate computational resources.

Figure 9:
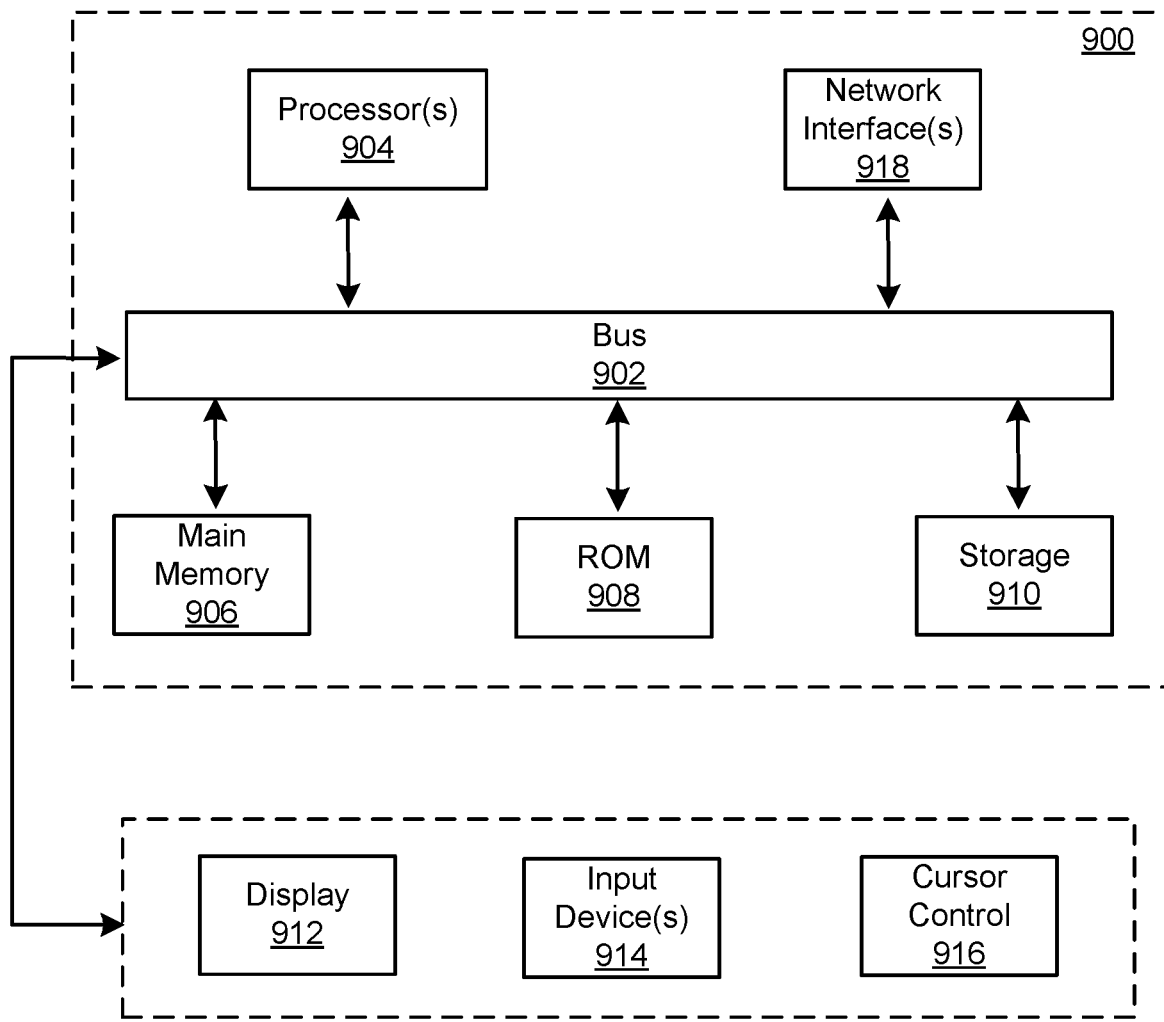
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer system for performing a set of hardware-specific tuning tasks with respect to a machine learning (ML) model, the computer system comprising:
   a memory storing a scheduler circuit, wherein the scheduler circuit operates in accordance with machine readable instructions;
   the scheduler circuit in communication with a job manager at an agent circuit, wherein the job manager receives a scheduling request message from the scheduler circuit and executes a scheduled autotuning stage; and
   one or more processors configured to access the memory and execute the machine readable instructions stored to:
      initiate, by the scheduler circuit, a first portion of a task with a graphics processing unit (GPU) or a central processing unit (CPU) based on a scheduling policy;
      schedule, by the scheduler circuit, a second portion of the task with the GPU or the CPU based on the scheduling policy, wherein the scheduling utilizes the GPU or the CPU while the GPU or the CPU is not in use from the first portion of the task;
      upon the job manager executing the scheduled autotuning stage and measuring an execution time associated with execution of the scheduled autotuning stage, receive, by the scheduling circuit, an update to an autotuning task metric from the execution of the scheduled autotuning stage, wherein the scheduled autotuning stage comprises a select stage, a build stage, a profile stage, or an update stage; and
      update, by the scheduler circuit, the autotuning task metric based at least in part on the received update.

2. The computer system of claim 1, wherein the agent circuit is configured to optimize inference performance of the ML model for a particular hardware configuration.

3. The computer system of claim 1, wherein the machine readable instructions further to:
   receive, by the scheduler circuit from the job manager, a registration request with autotuning options.

4. The computer system of claim 1, wherein the scheduler circuit utilizes exclusive resource access for only one stage at a time for a particular resource.

5. The computer system of claim 1, wherein the scheduler circuit utilizes shortest job first (SJF) to prioritize a first stage requiring short completion time over a second stage with longer completion time.

6. The computer system of claim 1, wherein a Multi-Process Service (MPS) is implemented to isolate computational resources.

7. The computer system of claim 1, further comprising a task launcher circuit residing with the scheduler circuit, wherein the task launcher circuit launches the task on the GPU or CPU residing on an agent circuit based on computation resource availability information of the GPU or CPU.

8. A computer-implemented method for performing a set of hardware-specific tuning tasks with respect to a machine learning (ML) model, the computer-implemented method comprising:
   initiating, by a scheduler circuit, a first portion of a task with a graphics processing unit (GPU) or a central processing unit (CPU) based on a scheduling policy, the scheduler circuit in communication with a job manager at an agent circuit, wherein the job manager receives a scheduling request message from the scheduler circuit and executes a scheduled autotuning stage;
   scheduling a second portion of the task with the GPU or the CPU based on the scheduling policy, wherein the scheduling utilizes the GPU or the CPU while the GPU or the CPU is not in use from the first portion of the task;
   upon the job manager executing the scheduled autotuning stage and measuring an execution time associated with execution of the scheduled autotuning stage, receiving, by the scheduler circuit, an update to an autotuning task metric from the execution of the scheduled autotuning stage; and
   updating, by the scheduler circuit, the autotuning task metric based at least in part on the received update.

9. The computer-implemented method of claim 8, further comprising:
optimizing inference performance of the ML model for a particular hardware configuration.

10. The computer-implemented method of claim 8, further comprising:
receiving, by the scheduler circuit from the job manager, a registration request with autotuning options.

11. The computer-implemented method of claim 8, wherein the scheduler circuit utilizes exclusive resource access for only one stage at a time for a particular resource.

12. The computer-implemented method of claim 8, wherein the scheduler circuit utilizes shortest job first (SJF) to prioritize a first stage requiring short completion time over a second stage with longer completion time.

13. The computer-implemented method of claim 8, wherein a Multi-Process Service (MPS) is implemented to isolate computational resources.

14. The computer-implemented method of claim 8, wherein the task is launched on the GPU or CPU residing on an agent circuit based on computation resource availability information of the GPU or CPU.

15. A non-transitory computer-readable storage medium storing a plurality of instructions executable by one or more processors, the plurality of instructions when executed by the one or more processors cause the one or more processors to:
initiate, by a scheduler circuit, a first portion of a task with a graphics processing unit (GPU) or a central processing unit (CPU) based on a scheduling policy, the scheduler circuit in communication with a job manager at an agent circuit, wherein the job manager receives a scheduling request message from the scheduler circuit and executes a scheduled autotuning stage;
schedule a second portion of the task with the GPU or the CPU based on the scheduling policy, wherein the scheduling utilizes the GPU or the CPU while the GPU or the CPU is not in use from the first portion of the task;
upon the job manager executing the scheduled autotuning stage and measuring an execution time associated with execution of the scheduled autotuning stage, receive an update to an autotuning task metric from the execution of the scheduled autotuning stage; and
update the autotuning task metric based at least in part on the received update.

16. The non-transitory computer-readable storage medium of claim 15, wherein the agent circuit is configured to optimize inference performance a machine learning (ML) model for a particular hardware configuration.

17. The non-transitory computer-readable storage medium of claim 15, wherein the one or more processors are further to:
receive a registration request with autotuning options.

18. The non-transitory computer-readable storage medium of claim 15, wherein the scheduler circuit utilizes exclusive resource access for only one stage at a time for a particular resource.

19. The non-transitory computer-readable storage medium of claim 15, wherein the scheduler circuit utilizes shortest job first (SJF) to prioritize a first stage requiring short completion time over a second stage with longer completion time.

20. The non-transitory computer-readable storage medium of claim 15, wherein a Multi-Process Service (MPS) is implemented to isolate computational resources.

* * * * *